H. BOLLMANN.
REMOVAL OF VOLATILE SOLVENTS FROM MATERIAL TREATED THEREWITH.
APPLICATION FILED DEC. 9, 1919.
1,371,546. Patented Mar. 15, 1921.
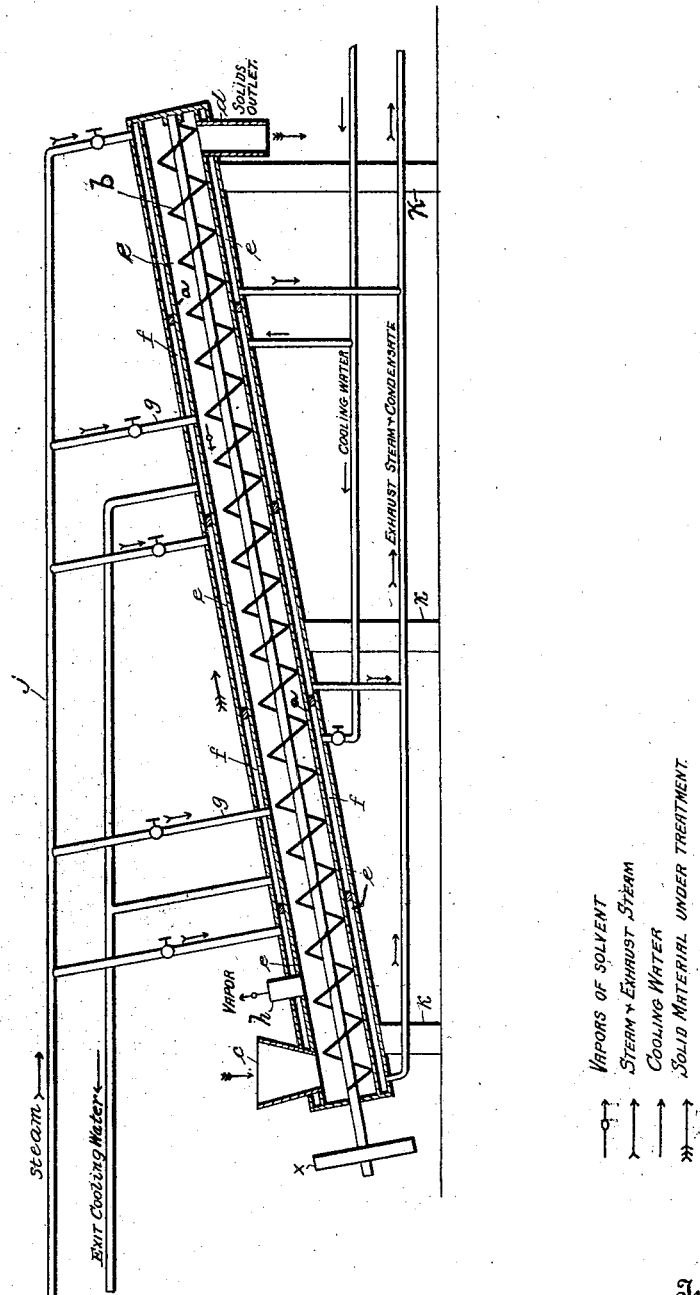

UNITED STATES PATENT OFFICE.

HERMANN BOLLMANN, OF HAMBURG, GERMANY.

REMOVAL OF VOLATILE SOLVENTS FROM MATERIAL TREATED THEREWITH.

1,371,546.  Specification of Letters Patent.  Patented Mar. 15, 1921.

Application filed December 9, 1919. Serial No. 343,639.

*To all whom it may concern:*

Be it known that I, HERMANN BOLLMANN, a citizen of Hamburg, Germany, residing at Hamburg, Germany, have invented certain new and useful Improvements in or Relating to the Removal of Volatile Solvents from Materials Treated Therewith, of which the following is a specification.

This invention relates to a process for the removal of volatile solvents, such as benzin, ether, alcohol or the like, from materials which have been treated with such solvents.

It consists in causing the materials to be moved in a continuous manner along a gradually rising path during which operation they are heated and brought into contact with steam on a counter current principle. The invention further embraces the apparatus herein described for effecting the process.

The steam penetrates into the materials, and assists the escape of the vapors of the solvents. The vapors of the solvents thus generated travel downwardly in counter current contact with the upwardly moving material, and are removed from contact with the material at near the point of introduction of the latter while the greater portion of the steam is condensed and precipitated on the solid material and together with this leaves the apparatus at the top, or in view of its low specific gravity escapes from mixture containing the heavier benzin or other vapors and passes upwardly. The process is by preference carried out so that the material is subjected alternately to heating and cooling whereby a more efficient penetration of steam into the material is obtained because at the cool places the vapors of benzin and the like change their volume and provide free access of the hot steam to the solid material.

The drawing shows by way of example an apparatus adapted for carrying out the process according to this invention. Arranged in a tubular jacketed receptacle $a$ is a worm $b$, driven in some suitable way, for example, by the drive pulley or gear illustrated at $x$, and conveying the material fed into the hopper $c$ in the direction of the arrow, while the solid material is discharged at $d$ in a continuous manner. The pipe $a$ is provided with means such as the jackets $e$ for heating, and with other means, such as the jackets $f$ for cooling, and is further provided with several steam inlets $g$. The escape of the solvent vapors takes place by the way of the receptacle $h$, which leads to a suitable condenser or washer.

The drawing illustrates steam being applied to the jackets $e$, for heating the same, as coming from the pipe $j$, which also supplies steam to the nipples $g$, which supply the steam to the interior of the tubular receptacle $a$. It is, of course, to be understood that any suitable heating medium could be delivered to these jackets or that the said portions of the tubular receptacle could be heated in any convenient manner. The cooling of jackets $f$ is likewise shown as being by water from a common pipe.

The tubular receptacle $a$ is, of course, carried upon a suitable support, for example, the posts $k$.

I claim:—

1. A process of removing volatile solvents from materials which have been treated therewith, which comprises causing the said materials to be conveyed in a continuous manner along a gradually rising path, alternately heating and cooling such materials during such conveying operation and subjecting the same to the action of steam in counter-current contact therewith during such conveying operation.

2. A process of removing volatile solvents from materials which have been treated therewith, which comprises continuously conveying the said materials along a gradually rising path, alternately heating and cooling such materials during such conveying operation, and simultaneously injecting steam into the said materials during such cooling operation.

3. An apparatus for removing vapors of volatile solvents from solid material carrying such solvents, such apparatus comprising an inclined jacketed tubular receptacle, a conveyer therein adapted to move the solid material from the lower end toward the higher end, a solid material inlet at the lower end, a solid material outlet at the higher end, an outlet for solvent vapor near the lower end, and a plurality of steam inlets to said receptacle at different points of its length.

4. An apparatus for removing vapors of volatile solvents from solid material carrying such solvents, such apparatus comprising an inclined tubular receptacle, a conveyer therein adapted to move the solid material from the lower end toward the higher end, a solid material inlet at the lower end, a solid material outlet at the higher end, an outlet for solvent vapor near the lower end, alternately arranged heating and cooling means located in heat-conducting relation with successive portions of the length of said receptacle, and steam inlets to the receptacle located in proximity to the cooled sections of the length thereof.

In testimony whereof I affix my signature.

HERMANN BOLLMANN.